Dec. 14, 1965 J. M. BENTLEY ETAL 3,223,992

ALTERNATING CURRENT DIGITAL TO ANALOG DECODER

Filed Aug. 9, 1961 2 Sheets-Sheet 1

INVENTORS
JOHN M. BENTLEY
JAMES H. BROWN

BY

H. H. Losche
ATTORNEYS

ALTERNATING CURRENT DIGITAL TO ANALOG DECODER

Filed Aug. 9, 1961 2 Sheets-Sheet 2

INVENTORS
JOHN M BENTLEY
JAMES H. BROWN
BY

H. W. Losche
ATTORNEYS

United States Patent Office 3,223,992
Patented Dec. 14, 1965

3,223,992

ALTERNATING CURRENT DIGITAL TO ANALOG DECODER

John M. Bentley, Glen Burnie, and James H. Brown, Severna Park, Md., assignors, by mesne assignments, to the United States of America as represented by the Secretary of the Navy Filed Aug. 9, 1961, Ser. No. 130,429
13 Claims. (Cl. 340—347)

Figure 1:
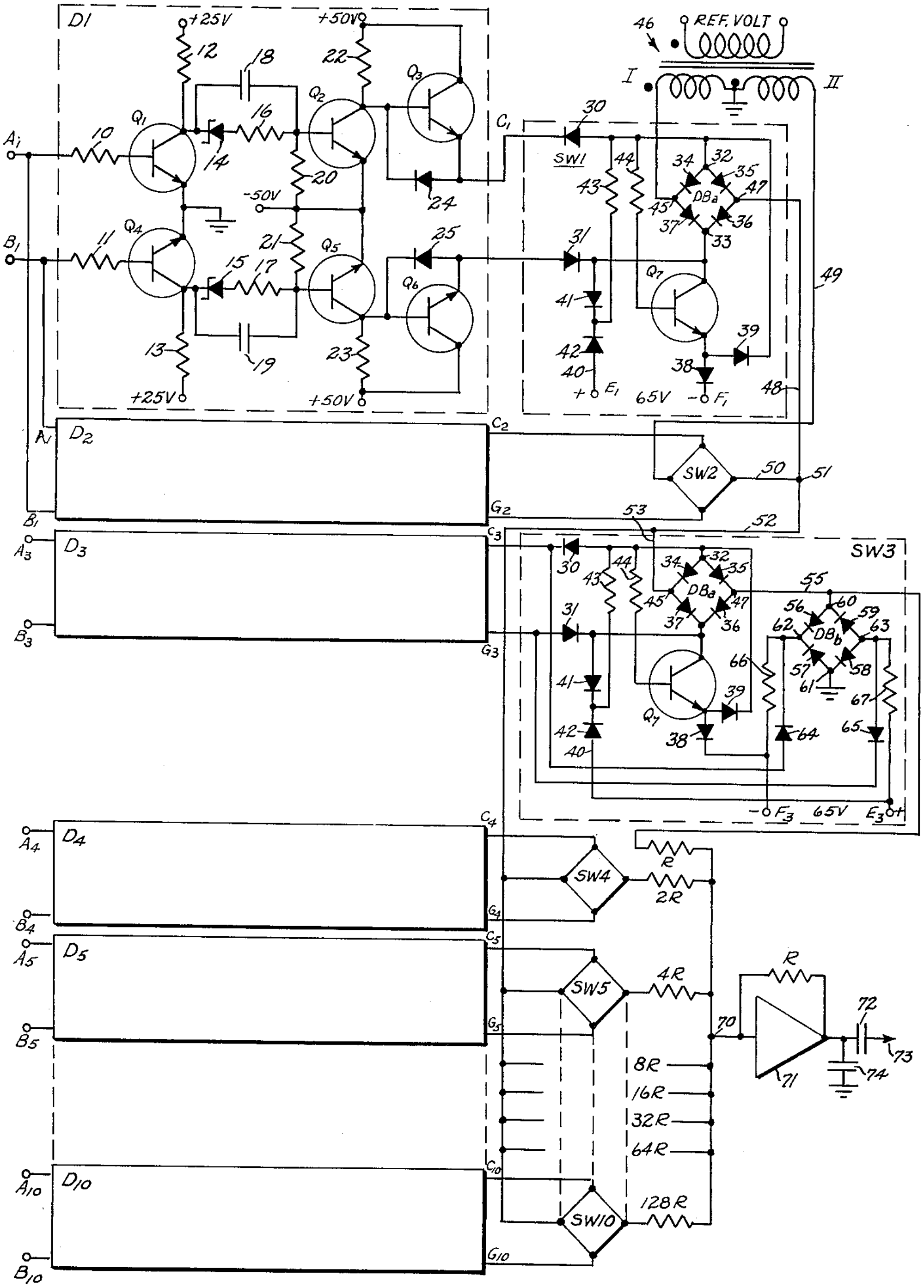

This invention relates to decoders for digital computers and more particularly to a decoder circuit for decoding a binary digital computer register combination output into alternating current signal voltage in amplitude and phase representative of the binary digital output combination or word.

In the use of binary digital computers, signal information ofttimes must be translated from alternating current or direct current voltage signals into a binary digital system by encoding and thereafter translated into other desirable or useful direct current or alternating current voltage signals by a decoding technique. Prior known decoders have taken the form of "and" circuits, tube and diode circuits in which "and" circuits may be a part of the tube and diode combination, and diode decoder matrices. It is the purpose of the decoder to translate a combination of digital computer signals into a discreet signal or signals representing that combination of digital computer signals.

In the present invention a decoding circuit is shown and described which is capable of translating the binary digital register output of a binary digital computer into alternating current voltage, the phase and amplitude of which represents the digital register signal combination. In this invention each of the digital computer output registers are adapted to be coupled through bit channels to binary weighted resistors which are coupled in common to the input of an alternating current amplifier to produce alternating current output signals representative of the digital register combination. The first bit channel adapted to be coupled to the first digital computer output register includes a transistorized switch driver circuit and a transistorized diode phase switching network coupled to receive opposite phases of an alternating current reference voltage to switch the phase of the reference voltage in accordance with the digital register input information. The phase switching network includes two diode switches, each functioning as a single-pole-single-throw switch. The output of the phasing switch network is coupled in common to a plurality of transistorized diode switching networks, each operating as a single-pole-double-throw switch, which are in a plurality of bit channels from the digital register input through switch driver circuits to one each of the binary weighted resistors. The binary weighted resistors increase in resistance in the order of the base 2 to the powers of zero succeeding upwardly by one to provide sufficient resistors to correspond with each bit or binary digital register input. The application of any binary digital register combination to the decoder circuit will cause the first bit channel to choose the phase of the alternating current reference voltage and will cause the remaining channels to choose the binary weighted resistors representative of the channel binary register combination to produce on the amplifier output an alternating current, in amplitude and phase, representative of that binary digital register input combination to the decoder. It is therefore a general object of this invention to provide an alternating current digital to analog decoder to produce accurate alternating current voltage signals in amplitude and phase representative of the combination of a binary digital register input.

Figures 2, 3:
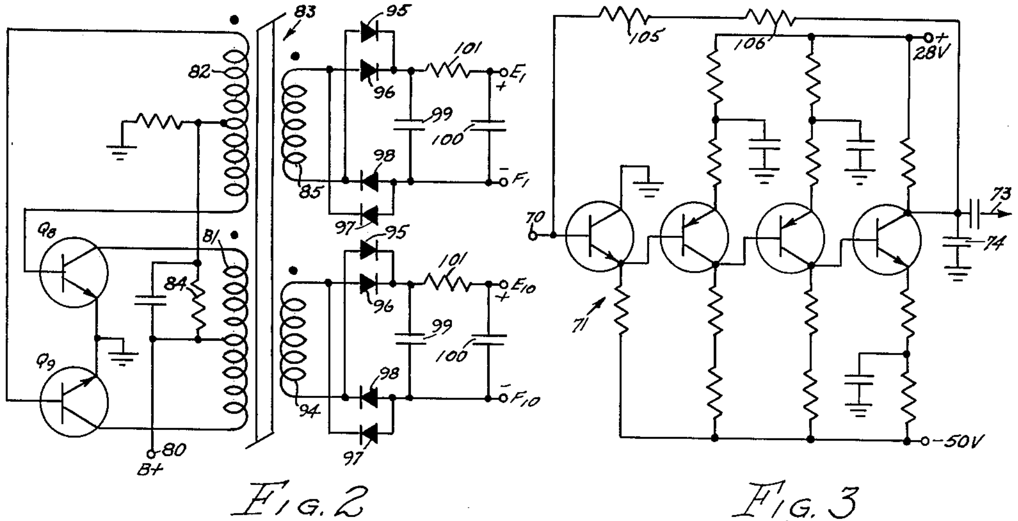
Figure 4:
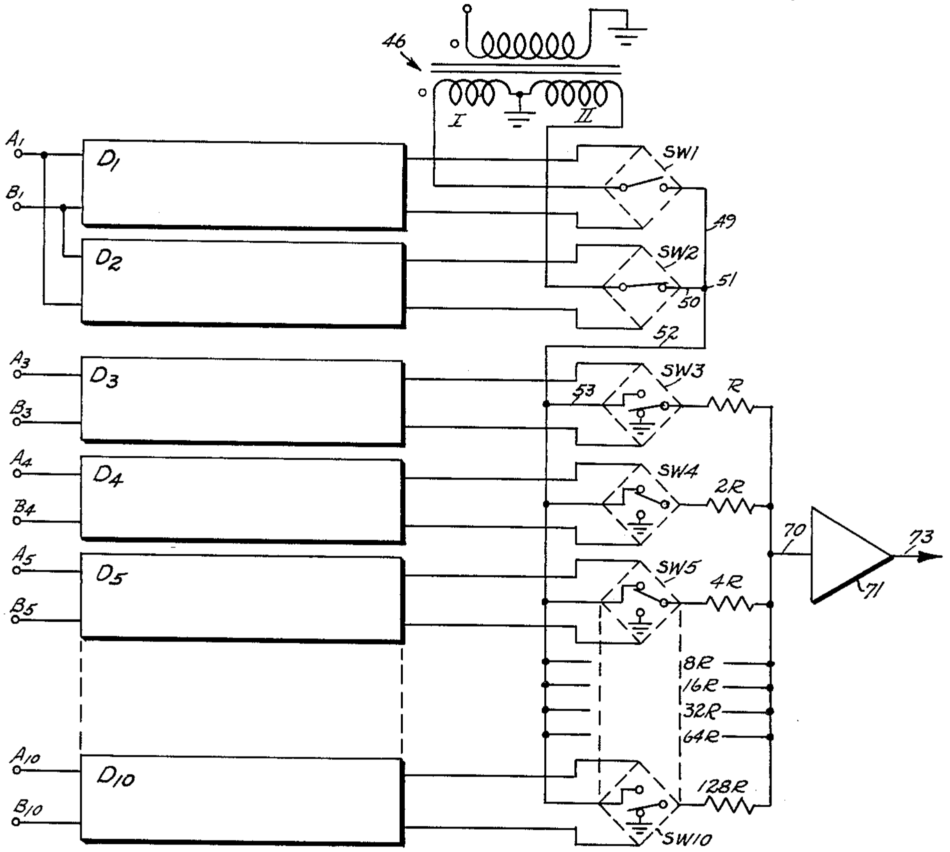

These and other objects and the attendant advantages, features, and uses will become more apparent to those skilled in the art as the description proceeds when considered along with the accompanying drawings in which:

FIGURE 1 is a circuit diagram partly in block and partly schematic illustrating the decoder circuit of this invention, FIGURE 2 is a circuit schematic diagram illustrating one form of producing a plurality of floating direct current voltages for the switch circuits in FIGURE 1, FIGURE 3 illustrates in a circuit schematic diagram the amplifier shown in block in FIGURE 1, and FIGURE 4 illustrates in block and circuit diagram a simplified version of FIGURE 1 with the operative portions of the switch driver circuits eliminated.

Referring more particularly to FIGURE 1, the terminals A1B1, A2B2, A3B3, et cetera, constitute the input terminals to the various channels of the decoder, each A and B pair of terminals adapted to be connected to the output of each register of a binary counter digital computer (not shown). Terminals A1 and B1 are applied as input terminals to two switch driver circuits D1 and D2 in reverse circuit relation. Since the switch driver circuit D1 is identical for all switch driver circuits D2 through D10, only the circuit of D1 will be described in detail. Terminals A1 and B1 are applied respectively through resistors 10 and 11 to the base terminals of a pair of transistors Q1 and Q4 having the emitter terminals thereof coupled in common to ground. The collector of transistor Q1 is coupled through a collector load resistor 12 to a positive voltage source herein shown as +25 volts although other collector load voltages may be used. The above voltage is merely being illustrated with value for the purpose of an example later to be described in the statement of operation. The collector electrode is also coupled through a zener diode 14 and a resistor 16 to the base of a transistor Q2. In parallel with the zener diode and resistor is a capacitor 18. The zener diode, for the purpose of illustration herein, is a 65 volt zener diode oriented to pass current whenever the voltage at the collector of transistor Q1 exceeds by 65 volts the voltage at the base of transistor Q2. The transistor Q2 is base biased from a negative voltage source, illustrated herein as −50 volts, through a biasing resistor 20. The emitter and collector of the transistor Q2 are coupled across the −50 volts source and a +50 volt source with a collector loading resistor 22 being in the network between the collector and the +50 volt source. The collector of the transistor Q2 is directly coupled to the base of a transistor Q3 the collector of which is directly coupled to the +50 volt source. The emitter of the transistor Q3 is coupled to its base through a diode 24 oriented to pass current in the low resistance direction from emitter to base. The emitter of the transistor Q3 constitutes the output of the upper half of the switch driver circuit D1 on the conductor C1. The switch driver circuit is a symmetrical circuit and, accordingly, the lower half of this circuit is identical to the upper half wherein odd number reference characters, advanced by one, are applied to corresponding elements having even number reference characters on the upper half of the circuit. The inputs to this switch driver circuit D1 are, accordingly, A1 and B1 with outputs C1 and G1 taken from the emitters of transistors Q3 and Q6.

Since the terminals A1 and B1 are adapted to be coupled to the first bit or register output of a binary digital computer (not shown), A1 will be positive and B1 will be negative, or vice versa. Since the digital computer registers are more normally multivibrator circuits with the outputs taken from the anodes or conduction electrodes of these multivibrators in the order of approximately +1.3 volts and −1.3 volts, let it be assumed for the purpose of example herein that the particular register stands with a +1.3 volts on the terminal A1 and a −1.3 volts on the terminal B1. The positive voltage on terminal A1 applied to the base of transistor Q1 will cause this transistor to conduct which will reduce the collector voltage to substantially zero or ground potential by virtue of the voltage drop across resistor 12 cutting off any voltage from the collector or transistor Q1 to the base of transistor Q2 since the base of transistor Q2 is biased negatively by the −50 volt source through resistor 20. Transistor Q2 is cut off producing a positive base voltage on transistor Q3 from the +50 volt source causing Q3 to conduct near saturation. The conduction of transistor Q3 to saturation substantially couples the +50 volt source directly to the output conductor C1. In the lower half of the circuit the negative voltage applied from the terminal B1 to the base of transistor Q4 holds transistor Q4 cut off in which the collector terminal is substantially +25 volts from the +25 volt source through the resistor 13. Since the collector of Q4 is near +25 volts, the voltage across the zener diode 15 is substantially 75 volts whereupon the zener diode 15 will conduct to produce voltage division at the base of transistor Q5 to bring this base voltage sufficiently positive to cause conduction of transistor Q5 thereby reducing the collector terminal voltage of transistor Q5 and, consequently, the base voltage of transistor Q6 to approach −50 volts. The high conduction of transistor Q5 producing the negative voltage at the collector thereof and on the base of transistor Q6 by virtue of the voltage drop across resistor 23, holds transistors Q6 completely cut off whereby the −50 voltage source is substantially coupled to the output conductor G1 through the diode 25. In the example just given it may be readily seen that whenever a positive voltage is applied at terminal A1 and a negative voltage is applied at terminal B1, a positive voltage of near 50 volts will be produced on the output C1 and a negative voltage of near 50 volts will be applied on the output conductor G1, and vice versa.

The operation of the other switch driver circuits D2 through D10 are the same as that described for the switch driver circuit D1 and, accordingly, when the switch driver circuit D1 is producing a positive and negative voltage on the output conductors C1 and G1, respectively, the switch driver circuit D2 will be producing a negative voltage and a positive voltage, respectively, on the outputs C2 and G2 by virtue of the input terminals A1 and B1 being reversely connected. The switch driver circuits D1 and D2 drive phasing switches SW1 and SW2, respectively. Since the output polarity of the switch driver circuits D1 and D2 operate in a reversed polarity relation, the switches SW1 and SW2 will be alternately closed-opened and opened-closed by the switch driver circuits D1 and D2.

Since phasing switches SW1 and SW2 are identical, only switch SW1 is shown in detail and the description thereof will suffice for both SW1 and SW2. The inputs C1 and G1 are through coupling diodes 30 and 31, oppositely oriented. The input C1 is through diode 30, cathode-to-anode, to one corner terminal 32 of a diode switching network DB*a* and the input G1 is through the diode 31, anode-to-cathode, to the opposite corner terminal 33 of the diode switching network DB*a*. The diode switching network DB*a* consists of four matched diodes in a bridge circuit in which the diodes are oriented in a low resistance direction, or anode-to-cathode direction, from the corner terminal 32 to the corner terminal 33. The corner terminal 33 couples the collector of a transistor Q7, the emitter of which is coupled through a diode 38 to the negative terminal F1 of a 65 floating voltage source. While a 65 volt floating source is described herein, it is to be understood that other voltage amplitudes may be used, the present 65 volt floating source being used merely for the purpose of giving one operative example of this invention. The emitter of transistor Q7 is likewise coupled through a diode 39 to the corner terminal 32 with the diode 39 oriented in the low resistance direction for positive current from the emitter of Q7 to the corner terminal 32. At a point between the diode 31 and the corner terminal 33 in the input conductor G1 is connected a conductor 40 having a pair of diodes 41 and 42 oppositely oriented with the common cathode terminals thereof being coupled through a resistor 43 to the corner terminal 32. The base of transistor Q7 is coupled through a resistor 44 to the corner terminal 32 of this diode switching network DB*a*. The conductor 40 is coupled to the positive terminal E1 of the 65 volt floating voltage source. The corner terminal 45 of the diode bridge DB*a* is coupled to one lead of the secondary of a reference voltage transformer 46 which secondary is center tapped to ground to produce one phase I of the secondary. The primary winding of the transformer 46 is coupled to an alternating current reference voltage source which may be preferably a 400 cycle voltage source although other frequencies may be used where desirable. The corner terminal 47 of the diode bridge DB*a* constitutes the output connected to conductor 48 of the phase switch SW1. The output phase II of the reference voltage transformer 46 is coupled to the phasing switch SW2 by conductor 49 to a terminal therein corresponding to the terminal 45 of a diode bridge in DB*a*. The output terminal corresponding to terminal 47 produces an output on the conductor 50 which conductors 48 and 50 are coupled in common at the terminal 51.

Taking the example as hereinabove given, where a positive voltage is applied to the terminal A1 and a negative voltage to B1, a substantially +50 volts will be conducted over the conductor C1 to the phasing switch network SW1 and at the same time a substantially −50 volts will be applied by way of conductor G1 to the phasing switch SW1. In this condition the diodes 30 and 31 will act as blocking diodes to cut off the positive and negative 50 volts to the phase switching network SW1. Under this condition the positive voltage E1 from the 65 volt floating voltage source will be conducted through the diode 42, the resistor 43, and the resistor 44 to place the transistor Q7 in a conduction state whereby the voltage from E1 passing through the resistors 43 to the corner terminal 32 of the diode bridge will be conducted in both paths through the diodes 34 and 37, and 35 and 36 through the collector and emitter of transistor G7 and through the diode 38 to the negative terminal F1 of the floating 65 volt source. This closes the diode switch bridge DB*a* so that the alternating current applied to the corner terminal 45 of the diode bridge will be conducted through the diode 37, transistor Q7, and diode 39 to corner terminal 32, and through diode 35 to the corner terminal 47 and thus on the output 48 conducting phase I of the alternating current reference voltage applied at transformer 46 to terminal 51. The reverse alternating path is 48, 47, 36, Q7, 39, 32, 34 and 45 to 46. At the same time that SW1 is closed by virtue of the positive voltage benig applied by conductor C1 and the negative voltage by conductor G1, the phasing switch SW2 will be open by virtue of a negative voltage being applied by way of conductor C2 and a positive voltage on the conductor G2. Whenever the voltage applied at terminals A1 and B1 is reversed such that a negative voltage is applied at A1 and a positive voltage at B1, a substantially −50 volts will be applied by way of conductor means C1 and a substantially +50 volts will be applied over conductor G1. Under this condition the positive voltage at G1 will be conducted through the diode 31, the diode 41, the resistor 43, and diode 30 which will produce at the corner terminal 32 a high negative voltage by virtue of the voltage drop across the resistor 43 to back bias the diode bridge switching network DB*a* to cut off the phase I alternating current voltage applied at terminal 45. At the same time the transistor Q7 will be cut off by virtue of the high negative voltage being applied through the resistor 44 to the base of transistor Q7. During the time that phasing switch SW1 cuts off phase I of the alternating current voltage, phase II of the alternating current reference voltage from transformer 46 will be conducted through phase switch SW2 to the output conductor 50 making phase II of the alternating current voltage applicable at terminal 51.

Terminals A3B3, A4B4, A5B5, et cetera, are adapted to couple, respectively, to succeeding register outputs of a binary digital computer (not shown) such that a substantially +1.3 volts and a substantially −1.3 volts are applied to terminals A and B, or B and A, respectively, in accordance with the setting of the digital computer register. A3B3, A4B4, et cetera, are coupled as inputs to switch driver circuits D3 through D10, respectively, which last mentioned switch driver circuits are identical to the switch driver circuit D1 and, accordingly, are shown in block diagram. The switch driver circuits D3 through D10 are coupled, respectively, to control digit switching networks SW3 through SW10, respectively. Digit switching networks SW3 through SW10 are identical and, accordingly, only switch SW3 is shown in detail. Digit switching network SW3 performs the function of a single-pole-double-throw switch and one part thereof is also identical to phasing switches SW1 and SW2 which function as single-pole-single-throw switches. Where like parts appear in the digit switch SW3 with those of phasing switch SW1, like reference characters are applied. The addition to the switch SW3 through SW10 to the switch structure of SW1 and SW2 is a diode bridge circuit DB*b* consisting of four matched diodes 56, 57, 58, and 59. The output 55 coming from the corner terminal 47 of the diode bridge DB*a* is coupled to the corner terminal 60 of the diode bridge DB*b*, the opposite corner terminal 61 being connected directly to a fixed potential such as ground. The corner terminal 62 of the diode bridge DB*b* is coupled through a diode 64 to the input conductor C3 and the corner terminal 63 of the diode bridge DB*b* is coupled through a diode 65 to the input terminal G3. The diode 64 is oriented in the low resistance direction for positive voltage from the conductor C3 to terminal 62 while the diode 65 is oriented in its low resistance direction from the terminal 63 to the input conductor G3. The corner terminal 62 of the diode bridge BD*b* is likewise coupled through a resistor 66 to the negative terminal F3 of a floating 65 volt source and the corner terminals 63 are coupled through a resistance 67 to the positive terminal E3 of the same floating 65 volt source. Whenever the terminal at A3 is positive and at B3 is negative the voltage on the conductor C3 is substantially +50 volts and the voltage on the G3 conductor is substantially −50 volts which is blocked by the diodes 30 and 31 whereupon the floating 65 voltage source is applicable on the bridge network DB*a* and the transistor Q7 to close the bridge circuit DB*a* in digit switch SW3 to conduct the alternating current at the terminal 51 by way of conductor means 52 and 53 to the output conductor 55 whether phase I or phase II of the alternating current reference voltage is present at the terminal 51. Since the voltage on conductor C3 is substantially +50 volts, the corner terminal 62 of the bridge network DB*b* will stand at substantially +50 volts, and, likewise, the voltage on conductor G3 being substantially −50 volts will apply substantially −50 volts at the corner terminal 63 of DB*b* to back bias the diode bridge opening any circuit from the corner conductor 60 to the corner conductor 61. The alternating current voltage on the conductor 55 will, accordingly, be conducted to resistor R.

If the voltages at A3 and B3 are reversed applying −1.3 volts at A3 and +1.3 at B3 the voltage at C3 will be substantially −50 volts and at G3 will be substantially +50 volts. This causes the diode bridge DB*a* in digit switch SW3 to open and the diode bridge DB*b* in SW3 to close. The corner terminals 62 and 63 will now have the floating voltage source of 65 volts applied thereto since the −50 volts from conductor C3 is blocked by the diode 64 and the +50 volts on conductor G3 is blocked by the diode 65. Resistor R will, accordingly, be grounded to the corner terminal 61 by virtue of the diode bridge DB*b* being closed, this circuit being through corner terminal 60, diode 56 to corner 62, and diode 57 to ground, or, more simply stated, the point 62 is at ground potential in the switch closed condition by virtue of resistor 66.

Each digit switch SW4 through SW10 will be switched in accordance with the voltages applied to the terminals A and B of the corresponding digital channels in accordance with the digital computer output registers adapted to be coupled thereto. Accordingly, the resistors R, 2R, 4R, 8R, et cetera, through 128R, will have one or the other phase I or II of the alternating current references voltage applied at transformer 46 impressed thereon or grounded in accordance with the setting of the respective digit switches SW4 through SW10. The resistors R, 2R, 4R, et cetera, are considered to be binary weighted to control the amplitude of the alternating current reference voltage applied thereto in accordance with the binary digit which the resistor represents to provide the analog of the digital output of a binary digital computer (not shown) adapted to be coupled to the decoder circuit. For example, but not in any way limiting the invention, the resistance R may be in the order of 20,000 ohms, the resistor 2R may be in the order of 40,000 ohms, the resistance 4R may be in the order of 80,000 ohms, et cetera, for the remainder of the binary weighted resistors R. The binary weighted resistors R through 128R are coupled in common to a terminal 70 being the input terminal to an alternating current amplifier 71, the output of which is through a capacitor 72 to an output conductor 73. A capacitor 74 is coupled between the output amplifier 71 and ground across which the alternating current is developed. A feedback resistance R is used in the amplifier circuit as will be more fully described in the description of FIGURE 3.

Referring more particularly to FIGURE 2, the separate floating power supplies supplying the floating 65 volt power to the various phasing switch networks and digit switching networks are produced by a direct current (D.C.) to D.C. converter in which a positive direct current voltage is applied to a terminal 80 and conducted to the center taps of primary windings 81 and 82 of a transformer 83. The primary winding 82 of the transformer 83 is energized through a dropping resistor 84 and the oppositely phased output terminals thereof apply base voltage to two transistors Q8 and Q9 to produce alternate conduction. The transistors Q8 and Q9 chop the primary current of the transformer driving the core into alternate saturation points. The outputs on the secondaries 85 through 94 are square waves that are full wave rectified by the rectifying diodes 95, 96, 97, and 98. The rectified alternating current is smoothed by the filter circuit consisting of the two capacitors 99 and 100 with the resistor 101 to produce the floating −F and +E voltage in the amplitude of 65 volts as illustrated for examples herein. While only two of these floating direct current voltage circuits are illustrated, it is to be understood that there should be one each for each of the two phasing switch networks and one each for each of the digit switch networks of FIGURE 1. It is also to be understood that the direct current voltage floating output can be changed to meet the needs, 65 volts floating being used in this description purely for the purpose of example in explaining the operation of the invention.

Referring more particularly to FIGURE 3, there is illustrated a transistor amplifier circuit for the amplifier 71 in FIGURE 1. This amplifier circuit is a conventional direct current coupled amplifier with both alternating current feedback for gain control through the resistance 105 and for temperature stability provided by the resistor 106. For the purpose of design the resistor 105 should be equal in value to the resistor R of FIGURE 1 so that the resistors R through 128R of FIGURE 1 are weighted with respect to the feedback resistor as shown to provide the corresponding alternating current gain for each input. It should be realized that an input from resistor R in FIGURE 1 with the remaining input resistors 2R through 128R grounded will give an output at 73 of one-half the voltage applied through resistor R. Current equations written for the summing point 70 for any combination of binary inputs will show that the analog output alternating current voltage is a direct function of the binary input. This assumes that the open loop gain of the amplifier is infinite. Since it is not, a small compensating resistor 106 is used in series with the feedback resistor to adjust the closed loop gain of the amplifier. Since the remainder of the amplifier circuit is conventional and well known, further description thereof is not deemed necessary.

FIGURE 4 illustrates, in a block schematic diagram, a very simplified circuit arrangement of the circuit schematic of FIGURE 1. In FIGURE 4 the switches SW1 through SW10 are illustrated as simple single-pole-single-throw and single-pole-double-throw blade switches exemplary of the corresponding switches in FIGURE 1 merely to provide a better understanding of the description of the operation of the invention. The switch driver circuits D1 through D10 are merely illustrated as being connected to the corners of the blocks SW1 through SW10 and are not intended to show operative connections thereto, reference to FIGURE 1 being necessary for this purpose.

*Operation*

In the operation of this device, referring to FIGURES 1 and 4, let it be assumed that the input terminals for the switch driver circuits D1 and D2 are minus for the terminal A1 and plus for the terminal B1. In this situation SW1 will be open and SW2 will be closed as shown in FIGURE 4. This will apply phase II of the alternating current reference voltage from transformer 46 in common to the alternating current input of each of the switches SW3 through SW10. If a negative voltage is applied at terminal A3 and a positive voltage applied to terminal B3, the switch driver circuit D3 will produce output voltages to cause digital switch SW3 to be switched to the position shown in FIGURE 4 closing the circuit from the resistor R to ground. If the register output of the digital computer (not shown) applies positive voltage to terminals A4 and A5, and therefore a negative voltage to the terminals B4 and B5, respectively, the switch driver circuits D4 and D5 will control their respective digit switch networks SW4 and SW5 to connect the phase II alternating current voltage through these switches to the resistors 2R and 4R. If the remainder of the digit switch networks SW6 through SW10 are in a position as shown in the example of FIGURE 4 for SW10 in which the respective resistors 8R through 128R are grounded, then only the alternating current phase II voltage applied through 2R and 4R to the amplifier are applied to produce an alternating current analog voltage representative of the combination of digital outputs from the digital computer registers (not shown) applied to terminals A and B of the decoding circuit. The resistors 2R and 4R herein being weighted in accordance with the binary digital bits will cause the alternating current voltage, phase II, to be applied to the amplifier 71 in the proper amplitude to provide the analog voltage of the digital number combination. It is to be understood that the first digital bit will determine the phase of the alternating current reference voltage but the remainder of the digital bits will determine the amplitude of the alternating current reference voltage to provide the analog voltage in proper phase and amplitude representative of the binary number combination.

While many changes may be made in the constructional details and features of this invention, as by the use of different voltages or different frequencies of the alternating current reference voltage as shown and described herein, without departing from the spirit and scope of this invention, it is to be understood that we desire to be limited only in the spirit and scope of the appended claims.

We claim:

1. An alternating current digital to analog decoder comprising: an alternating current reference voltage; a phase switching means coupled to said alternating current reference voltage to apply at an output thereof one of two phases of said alternating current voltage reference; a plurality of binary weighted resistors coupled in common to an amplifier; a plurality of digit switch means coupled in common to the output of said phase switching means and one each respectively to one each of said binary weighted resistors; a plurality of switch driver means adapted to have the inputs thereof coupled respectively to stages of binary digital outputs, one switch driver means adapted to have its input coupled to one binary digital output stage and its output coupled to control said phase switching means and the remaining switch driver means adapted to have their inputs coupled to one each binary digital output and their outputs coupled respectively to one each digit switch means whereby said binary weighted resistors have alternating current applied thereto in the selected order and phase by said switch driver means and digit switch means to produce on the output of said amplifier an analog alternating current voltage representative of a binary computer digital combination input.

2. An alternating current digital to analog decoder as set forth in claim 1 wherein said phase switching means includes a pair of diode switching networks each controlled by a pair of said switch driver means, said last-mentioned switch driver means having the inputs thereof reversely coupled to cause said diode switching networks to be alternately switched in opposite switching phases.

3. An alternating current digital to analog decoder as set forth in claim 2 wherein said plurality of digit switch means each in one switched condition couples said alternating current references voltage therethrough to the respective binary weighted resistor and in another switched condition couples said respective binary weighted resistor to ground.

4. An alternating current digital to analog decoder as set forth in claim 3 wherein said plurality of digit switch means each include two diode switching networks, one of said two diode switching networks being coupled to produce said one switched condition and the other of said two diode switching networks being coupled to produce said other switched condition.

5. An alternating current digital to analog decoder as set forth in claim 4 wherein said binary weighted resistors progress in the order of 2 to a power, said power increasing from 0 upwards progressively by one to give values to the resistors from the lowest to the highest digital stage adapted to be associated therewith.

6. An alternating current digital to analog decoder circuit comprising: an alternating current reference voltage having two outputs of opposite phase; a pair of phasing switch networks, each having an input thereof coupled respectively to one each of said two outputs of opposite phase of said alternating current reference voltage with said pair of phasing switch networks having a common output; a pair of switch driver circuits coupled respectively to each of said pair of phasing switch networks to control the alternate opening and closing of said pair of phasing switch networks, said switch driver circuits having two inputs thereof reversely coupled in common, the common coupled inputs adapted to be coupled to the output of one register of a binary counter output; a plurality of binary weighted resistors having one end coupled in common as an input to an amplifier, said resistors increasing in resistance in the same order as binary digit columns; a plurality of digit switch networks having the inputs thereof coupled in common to the common output of said phasing switch networks and the outputs thereof coupled respectively to the other ends of one each of said pulrality of binary weighted resistors; and a plurality of switch driver circuits, each adapted to have its input coupled to an output register of a binary counter and its output coupled to one digit switch circuit to provide channels to said binary weighted resistors in a corresponding order from the lowest to the highest representative binary columns whereby the amplitude and phase of the alternating current reference voltage applied to said binary weighted resistors will produce on the amplifier output an analog alternating current phased voltage of a binary digital register output adapted to be coupled to said decoder.

7. An alternating current digital to analog decoder circuit as set forth in claim 6 wherein said phasing switch networks are diode switches operative as a single-pole-single-throw switch.

8. Alternating current digital to analog decoder circuit as set forth in claim 7 wherein said digit switch networks include two pairs of diode switch networks each pair coacting to operate as single-pole-double-throw switch which, under one switched condition, connects the alternating current from said alternating current reference voltage to the respective binary weighted resistor and, under the other switched condition, connects said respective binary weighted resistor to a fixed potential.

9. An alternating current digital to analog decoder circuit as set forth in claim 8 wherein said switch driver circuits include two symmetrical transistor channels, each channel having said input thereto and each channel having an output constituting the coupling to the respective switch circuit, said transistor channels being coupled to a positive and a negative voltage source to alternately switch same to the two outputs whereby under one input condition to said switch driver circuit one output will be positive and the other output will be negative, and vice versa.

10. An alternating current digital analog decoder circuit as set forth in claim 9 wherein said phasing diode switch network comprises four matched diodes in a bridge network oriented in one direction from one corner to the opposite corner to which opposite corners is applied a floating direct current voltage, and to the other pair of opposite corners is applied said input and output of said phasing switch network, and diode switching means coupling the two outputs of said related switch driver circuit to switch said floating direct current voltage to be effective and ineffective to condition said diode bridge network to pass and block the conduction from the input to the output as said two outputs of said switch driver networks alternate between positive and negative voltages.

11. An alternating current digital to analog decoder circuit as set forth in claim 10 wherein said digit switch networks of two pairs of diode switch networks comprise a four diode bridge network coupled to a four diode bridge network, the latter being substantially the same as said phasing switch network, said first-mentioned four diode bridge network having said floating direct current voltage coupled across opposite corners with said four diodes oriented to allow conduction therethrough and said opposite corners likewise being coupled to the two inputs to said digit switch networks to block the flow of said floating direct current voltage under one condition of input voltage and to allow the flow of floating direct current voltage under another condition of input voltages, and said other opposite corners of said first-mentioned diode bridge being coupled between the output of said digit switching network and a fixed potential whereby said digit switch network operates as a single-pole-double-throw switch.

12. An alternating current digital to analog decoder circuit as set forth in claim 11 wherein said floating direct current voltage for each of said phasing switch networks and said digit switch networks is separate from the other floating direct current voltage whereby the floating direct current voltages for one switch network floats with respect to the floating direct current voltage of all other switch networks.

13. An alternating current digital to analog decoder circuit as set forth in claim 12 wherein said plurality of binary weighted resistors coupled as an input to an amplifier increase in resistance by the base order of 2 to a power, said power increasing from zero progressively upwards by one, said lowest power resistor being coupled to the digit switch network controlled from a switch driver circuit adapted to be coupled to the lowest binary digit register and succeeding binary weighted resistors increasing in resistance progressively as the digit switch and switch driver circuit combinations progress with the binary digit registers.

References Cited by the Examiner

UNITED STATES PATENTS 3,019,426 1/1962 Gilbert ------------ 340—347

MALCOLM A. MORRISON, *Primary Examiner.*